(12) United States Patent
Cuomo et al.

(10) Patent No.: US 7,275,239 B2
(45) Date of Patent: Sep. 25, 2007

(54) RUN-TIME WAIT TRACING USING BYTE CODE INSERTION

(75) Inventors: Gennaro A. Cuomo, Apex, NC (US);
Erik A. Daughtrey, Durham, NC (US);
Michael L. Fraenkel, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 10/361,325

(22) Filed: Feb. 10, 2003

(65) Prior Publication Data

US 2004/0158819 A1 Aug. 12, 2004

(51) Int. Cl.
*G06F 9/44* (2006.01)

(52) U.S. Cl. .................... 717/130; 717/131

(58) Field of Classification Search ............ 717/114, 717/127, 130, 128, 124, 131, 158; 705/71
See application file for complete search history.

(56) References Cited

U.S. PATENT DOCUMENTS

| | | | | |
|---|---|---|---|---|
| 5,960,198 A * | 9/1999 | Roediger et al. | ........... | 717/130 |
| 6,016,466 A * | 1/2000 | Guinther et al. | ........... | 702/187 |
| 6,072,953 A * | 6/2000 | Cohen et al. | ........... | 717/166 |
| 6,311,327 B1 * | 10/2001 | O'Brien et al. | ........... | 717/114 |
| 6,721,941 B1 * | 4/2004 | Morshed et al. | ........... | 717/127 |
| 6,802,054 B2 * | 10/2004 | Faraj | ........... | 717/128 |
| 6,862,444 B2 * | 3/2005 | Karaoguz et al. | ........... | 455/408 |
| 7,143,396 B2 * | 11/2006 | Suresh | ........... | 717/130 |
| 2002/0128984 A1 * | 9/2002 | Mehta et al. | ........... | 705/71 |
| 2003/0009401 A1 * | 1/2003 | Ellis | ........... | 705/35 |
| 2004/0078691 A1 * | 4/2004 | Cirne et al. | ........... | 714/38 |

OTHER PUBLICATIONS

Chandler, Ajay et al., "Mobile Code Security by Java Bytecode Instrumentation", *IEEE*, Jul. 2001: 27-40.
Havelund, Klaus et al., "Monitoring Java Programs with Java PathExplorer", Elsevier Science B.V., 2001 (all pages).

* cited by examiner

*Primary Examiner*—Tuan Dam
*Assistant Examiner*—Thuy Dao
(74) *Attorney, Agent, or Firm*—Marcia L. Doubet; A. Bruce Clay

(57) ABSTRACT

Methods, systems, computer program products, and methods of doing business whereby programmatically-generated byte code insertion is used to perform run-time tracing of code that potentially encounters a wait during execution. The byte code insertion is performed at load time, and inserts byte codes before and after a located (potential) wait point. The inserted byte code functions to gather execution statistics, such as a time stamp before invoking a located wait point and a time stamp after invoking the located wait point. Preferred embodiments allow this tracing to be selectively activated/deactivated.

25 Claims, 15 Drawing Sheets

FIG. 9A

```
public class FinallyTest
{
    public static void main( String args[] )
    {
        FinallyTest ft = new FinallyTest();
        ft.doit();
    }
    public void doit()
    {
        System.out.println("Original code");
    }
}
```

FIG. 9B

```
getstatic java.io.PrintStream java.lang.System.out
ldc "Original code"
invokevirtual void java.io.PrintStream.println(java.lang.String)
return
```

FIG. 10A

```
public class FinallyTest
{
    public static void main( String args[] )
    {
      FinallyTest ft = new FinallyTest();
      ft.doit();
    }
    public void doit()
    {
      int startTime = 0;
      int correlator = 0;
      try
      {
        if( _fActive_1234 == true )
        {
            int locID = 1234;
            boolean fOuterMost = false;
            startTime = HighResTimer.getCurrent();
            correlator = CorrelatorService.getCorrelator();
            RuntimeSvc.preinvokeHandler( locID, correlator,
               startTime, fOuterMost, this );
        }
        System.out.println( "Original code" );
      }
      finally
      {
        if( _fActive_1234 == true )
        {
            int locID = 1234;
            boolean fOuterMost = false;
            int endTime = HighResTimer.getCurrent();
            RuntimeSvc.postinvokeHandler( locID, correlator,
               startTime, endTime, fOuterMost, this );
        }
      }
    }
    public static boolean _fActive_1234 = false;
}
```

FIG. 10B

```
        iconst_0
        istore_1
        iconst_0
        istore_2
TAG_4:  getstatic boolean FinallyTest._fActive_1234
        iconst_1
        if_icmpne TAG_0
        sipush #1234
        istore_3
        iconst_0
        istore v4
        invokestatic int HighResTimer.getCurrent()
        istore_1
        invokestatic int CorrelatorService.getCorrelator()
        istore_2
        iload_3
        iload_2
        iload_1
        iload v4
        aload_0
        invokestatic void RuntimeSvc.preinvokeHandler(int, int, int,
              boolean, java.lang.Object)
TAG_0:  getstatic java.io.PrintStream java.lang.System.out
        ldc "Original code"
        invokevirtual void java.io.PrintStream.println(java.lang.String)
        jsr TAG_1
        goto TAG_2
%Catch all from TAG_4 to TAG_5 using TAG_5
TAG_5:  astore v5
        jsr TAG_1
        aload v5
        athrow
```

FIG. 10B
(cont'd)

```
TAG_1:   astore v6
         getstatic boolean FinallyTest._fActive_1234
         iconst_1
         if_icmpne TAG_3
         sipush #1234
         istore v7
         iconst_0
         istore v8
         invokestatic int HighResTimer.getCurrent()
         istore v9
         iload v7
         iload_2
         iload_1
         iload v9
         iload v8
         aload_0
         invokestatic void RuntimeSvc.postinvokeHandler(int, int, int, int,
                 boolean, java.lang.Object)
TAG_3:   ret v6
TAG_2:   return
```

RUN-TIME WAIT TRACING USING BYTE CODE INSERTION

BACKGROUND OF THE INVENTION

1. Field of the Invention

The present invention relates to computer software, and deals more particularly with methods, systems, computer program products, and methods of doing business whereby programmatically-generated byte code insertion is used to perform run-time tracing of code that waits (or may potentially wait).

2. Description of the Related Art

The Java™ programming language developed by Sun Microsystems, Inc. has gained wide acceptance for writing software for the Internet and World Wide Web. While compilers for most programming languages generate code for a particular operating environment, Java enables writing programs using a "write once, run anywhere" paradigm. ("Java" and "Write Once, Run Anywhere" are trademarks of Sun Microsystems, Inc.)

Java attains its portability through use of a specially-designed virtual machine ("VM"). This virtual machine is also referred to as a "Java Virtual Machine", or "JVM". The virtual machine enables isolating the details of the underlying hardware from the compiler used to compile the Java programming instructions. Those details are supplied by the implementation of the virtual machine, and include such things as whether little Endian or big Endian format is used for storing compiled instructions, and the length of an instruction once it is compiled. Because these machine-dependent details are not reflected in the compiled code, the code can be transported to a different environment (a different hardware machine, a different operating system, etc.), and executed in that environment without requiring the code to be changed or recompiled—hence the phrase "write once, run anywhere". The compiled code, referred to as Java "byte code", then runs on top of a JVM, where the JVM is tailored to that specific operating environment. As an example of this tailoring of the JVM, if the byte code is created using little Endian format but is to run on a microprocessor expecting big Endian, then the JVM would be responsible for converting the instructions from the byte code before passing them to the microprocessor.

Servers in which Java applications are hosted, commonly referred to as "Java application servers" (or simply "application servers"), may provide run-time services to a myriad of Java applications, and these applications may service requests for a large number of concurrent requesters (including other programs as well as human users). The performance requirements placed on these application servers by the deploying enterprise and/or its end users are typically quite demanding, and as the Java applications and deployment scenarios become increasingly complex, these performance requirements tend to increase as well.

The performance of a Java application can suffer if the application executes one or more types of "waits". For example, applications often need to access a limited resource, such as by connecting to a database to retrieve or store data. The number of available connections to a database is often restricted to a configured maximum, and thus some of the concurrently executing threads may have to block until a database connection becomes available. In a web-centric environment, the incoming requests to an application server may be very homogeneous, such that many requests attempt to exercise the same or similar execution paths. Thus, blockages on commonly-needed critical resources may occur relatively often, and these blockages can have an adverse effect on many users. In such situations, contention for the resources frequently becomes a major source of bottlenecks in application servers.

More generally, whenever an application is forced to wait, performance suffers. In many cases, the applications make use of various types of synchronization that is facilitated by Java monitors. Synchronization can be used to protect shared resources (e.g., by serializing access to a resource) or to enforce an ordering of execution (e.g., by using event handling, where one thread waits for another thread to signal, or "notify", that it has reached a particular point; this is particularly common for synchronizing operation among producer threads and consumer threads). However, synchronization generally reduces concurrency, and if the applications executing on a particular application server are encountering a large number of waits and/or are waiting for relatively long periods of time, performance will be degraded.

It is therefore advantageous to determine how a particular application, or perhaps a plurality of applications, executing on an application server is/are waiting in a production environment. Techniques are known in the art for observing application performance characteristics using tools such as the Java Virtual Machine Profiling Interface ("JVMPI"), which allows peeking into the operation of a JVM. However, the JVMPI is a relatively heavyweight approach that has drawbacks. For example, for many JVMs, just-in-time compilation (commonly referred to as "JIT") must be turned off when the JVMPI is enabled. This typically alters the performance aspects of the system being analyzed, making the gathered information somewhat unreliable as a predictor of true run-time behavior.

Accordingly, a need exists for overcoming these shortcomings of the prior art.

SUMMARY OF THE INVENTION

An object of the present invention is to enable capturing run-time information to determine how a particular application executing on an application server is waiting in a production environment.

Still another object of the present invention is to make this determination in a manner that provides minimal disruption to the execution characteristics of the application.

Another object of the present invention is to provide techniques for programmatically altering (i.e., instrumenting) code that is being loaded, such that information about waits will be gathered as the code executes.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for programmatically instrumenting code in order to observe wait characteristics of an executing application. In a preferred embodiment, this technique comprises: analyzing application code to locate one or more points in the code where a wait may occur at run time; and programmatically instrumenting the located points, at load time, to track execution data Analyzing the application code may comprise consulting a specification of operation codes to be included when locating the points where a wait may occur, and/or of operation codes to be excluded. Optionally, the located points may be modified to exclude one or more thereof.

In one aspect, programmatically instrumenting the located points preferably further comprises programmatically inserting byte code surrounding the located points. This programmatically inserted byte code surrounding each of the located points is preferably operable to measure elapsed execution time at that located point, in which case the technique may further comprise: measuring, at run time, the elapsed execution time for at least one of the located points; and recording the at least one measured elapsed execution time.

In another aspect, programmatically instrumenting the located points preferably further comprises: intercepting load requests for executable elements of the application code at run time; programmatically inserting byte code surrounding any of the located points that are found within each executable element for which a load request is intercepted, thereby creating an instrumented executable element; and loading, for each intercepted load request, the instrumented executable element in place of the executable element. In this aspect, the programmatically inserted byte code may, in some embodiments, surround only the located points for which a variable setting indicates that run-time tracing is to be performed.

The technique may further comprise selectively deactivating operation of one or more of the instrumented points at run time.

The disclosed techniques may also be used advantageously in methods of doing business, whereby a service is offered to clients for determining performance bottlenecks that are caused (or exacerbated) by waits. This service may be provided under various revenue models, such as pay-per-use billing, monthly or other periodic billing, and so forth.

The present invention will now be described with reference to the following drawings, in which like reference numbers denote the same element throughout.

BRIEF DESCRIPTION OF THE DRAWINGS

FIGS. 9A and 9B and 10A and 10B provide samples showing a class and its byte code, and an instrumented version of this class and the corresponding byte code, instrumented according to preferred embodiments of the present invention;

DESCRIPTION OF PREFERRED EMBODIMENTS

Historically, it has been difficult to provide tools to resolve concurrency problems in Java application servers effectively, since most existing tools rely on a relatively heavyweight approach to enabling data capture. The present invention, on the other hand, discloses a relatively lightweight approach to performance monitoring, using selective byte code insertion for capturing data needed to detect and resolve many concurrency issues related to wait points in Java applications. Preferred embodiments allow, in particular, gathering data related to use of synchronization in Java applications.

The basic types of synchronization used by Java application programs fall into two categories: mutex and event. Other synchronization mechanisms are then built on top of these two basic types.

Mutexes are typically implemented in one of two ways—either through synchronization within a method or synchronization across an entire method. In the former case, a block of code within a method may be marked as being synchronized, in which case the JVM ensures that only one thread is executing within this code block at a time. In the latter case, a method is marked as being a synchronized method, which means that the JVM will automatically ensure that one invocation of that method has completed before the next invocation can begin (in the case of a synchronized static method) or that anything synchronized on the associated object will wait (in the general case).

Events, on the other hand, are synchronized using the wait and notify (or "notifyall") mechanisms that are built into the JVM.

Figure 1:
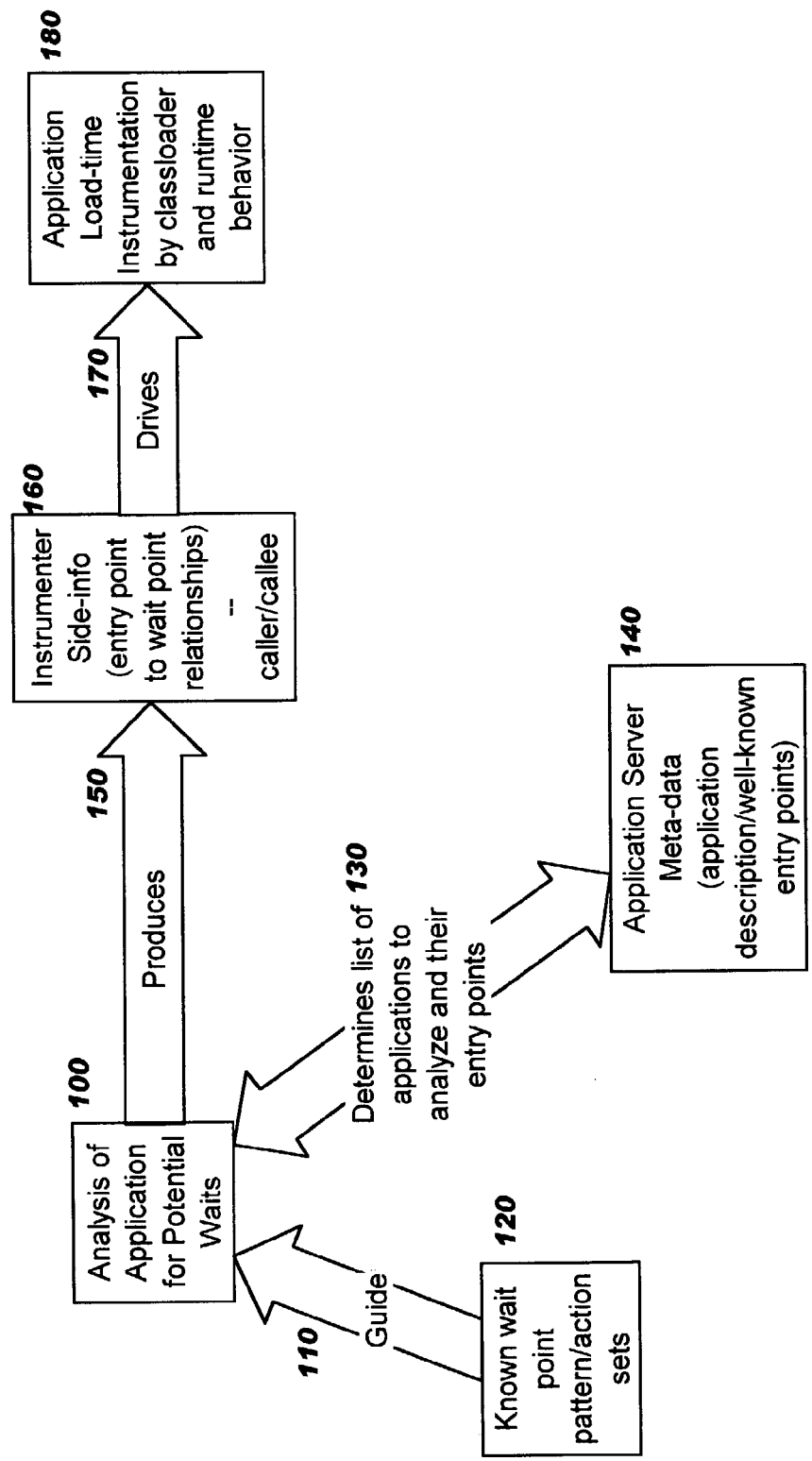
FIG. 1 is a block diagram illustrating, at a high level, components involved in operation of preferred embodiments of the present invention.

The block diagram in FIG. 1 illustrates, at a high level, components involved in operation of preferred embodiments of the present invention. As shown therein, a static analysis operation 100 may be guided 110 by knowledge about wait point patterns and/or action sets (hereinafter, "wait point patterns") 120. That is, information in the wait point patterns 120 is used as a type of configuration information in controlling operation of the static analyzer. In preferred embodiments, wait point patterns 120 include an identification of specific wait points to drive the static analysis (e.g., rules about what a wait point looks like and whether to traverse its subtrees, etc.). In preferred embodiments, the known wait point patterns that are identified in 120 may be used in an inclusive manner or an exclusive manner (that is, as a list of points to be instrumented and also of points not to be instrumented); thus, a Boolean is preferably associated with each wait point to convey whether this is a point to be included or a point to be excluded from instrumentation. Another Boolean flag is preferably associated with each wait point that indicates whether or not the subtree of this wait point should be recursively processed by the static analyzer.

Static analysis operation 100 also uses, as input, a set of meta-data 140. In preferred embodiments, this meta-data 140 comprises descriptive information about an application that is deployed in an application server and that is to be instrumented, including the application's entry points (as noted at 130). (These "application entry points" correspond to the application's classes that are directly called by the application server run-time to service requests.) Alternatively, the meta-data may comprise information about a plurality of applications. (The wait point patterns 120 and meta-data 140 may be combined into a single data structure, in an alternative embodiment, without deviating from the scope of the present invention.)

Figure 2:
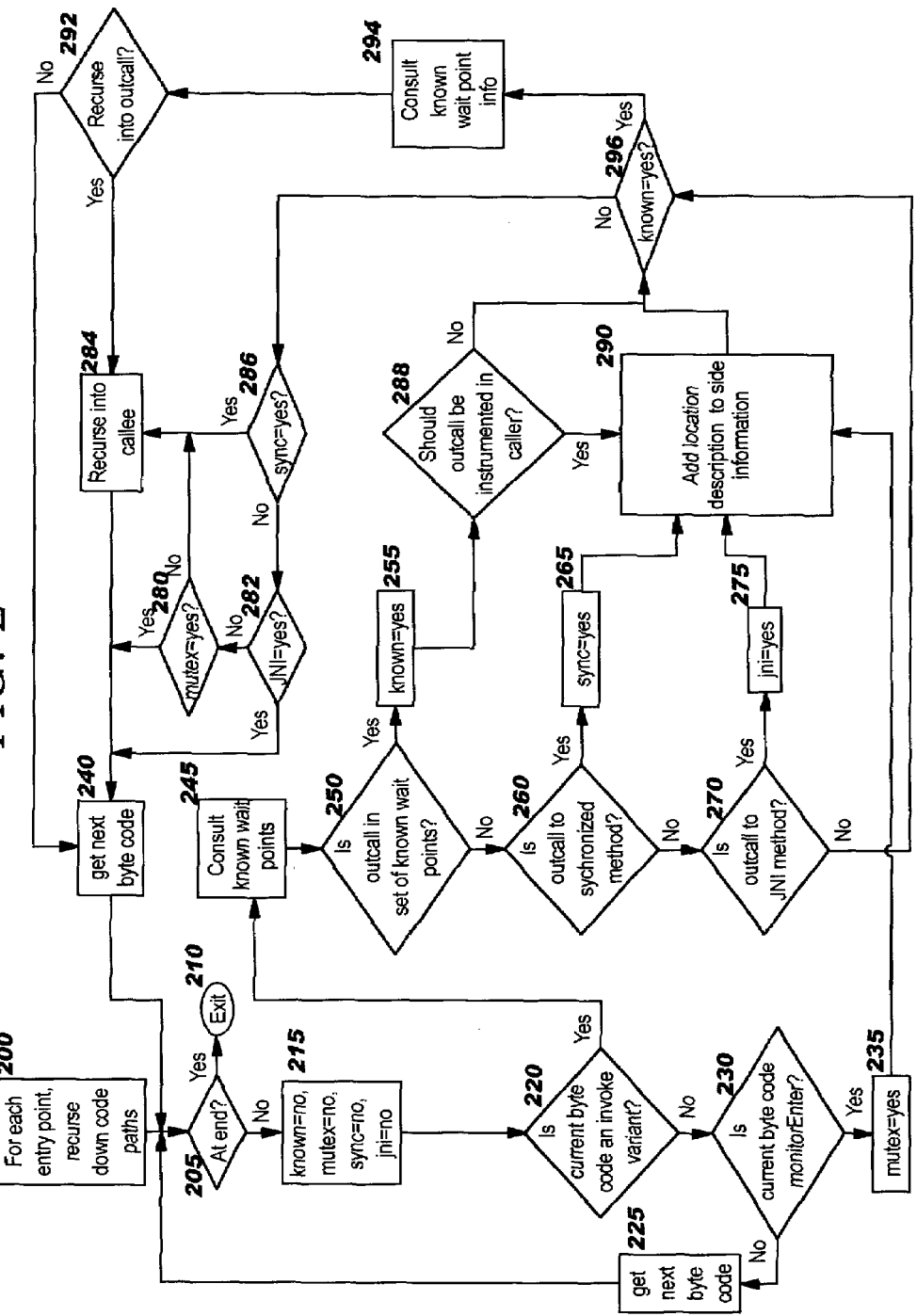
FIG. 2 provides a flowchart depicting logic that may be used to determine desired instrumentation points in an application.

The analysis operation 100 is preferably performed as a static analysis operation. That is, this analysis is preferably performed in advance, prior to run-time execution of the application(s). The analysis of the application code determines where best to use byte code insertion to identify where, at run time, the application waits. In preferred embodiments, the analysis operation 100 produces 150 "side information" 160 (e.g., a table or other structure containing information to be accessed during subsequent operations), which will be described in more detail with reference to FIGS. 2-14. For example, this side information 160 preferably comprises a set of entry point to wait point relationships and caller-to-callee relationships. (See FIG. 3.) FIG. 2 illustrates one manner in which the analysis operation 100 may be implemented.

FIG. 1 also illustrates that the side information 160 is used to drive 170 a load-time instrumentation operation 180, whereby an augmented class loader selectively inserts byte code into classes to be loaded. The manner in which the load-time instrumentation operation 180 may be implemented is illustrated in more detail in FIGS. 4-6, and the byte code that is programmatically inserted preferably implements logic such as that described in FIGS. 11-13.

Preferred embodiments analyze the byte code of methods, in order that simple translations can be programmatically performed to effect the changes required to keep track of monitor utilization and/or other waits during run time. The approach taken herein is to change the byte code in a manner that allows preserving the original semantics of the method being instrumented, and in preferred embodiments a programmatically-inserted method is invoked before attempting to get the monitor and another programmatically-inserted method is invoked after successfully getting the monitor—or, in the case of a general wait, before and after the instruction expected to wait. (The time difference is then computed, and represents the time spent waiting to get the monitor or more generally, the time spent waiting.) As stated earlier, the static analysis operation 100 of FIG. 1 determines where the instrumentation should be performed for a particular application, and the load-time instrumentation operation 180 uses an augmented class loader to selectively insert byte code into classes to be loaded, at the determined locations (referred to herein as "instrumentation points").

The static analysis operation 100 will be described in more detail with reference to FIG. 2. The Java 2 Platform, Enterprise Edition ("J2EE"™), which is provided for use in an enterprise environment such as that commonly used in a web-centric environment, provides for a standard set of entry points. ("J2EE" is a trademark of Sun Microsystems, Inc.) The application deployment mechanisms demanded by the J2EE specification require application servers to understand the major entry points for the applications deployed within them. Thus, the meta-data 140 preferably includes a list or similar structure specifying the entry points of interest for the application(s) to be statically analyzed for byte code insertion. These entry points can then be traversed to find potential contention and/or wait points (referred to generally herein as wait points).

Before describing FIG. 2 in detail, an overview of the static analysis operation will now be provided.

Preferably, the static analyzer is initiated on an application (or applications) in a non-production environment, such as a pre-production system where application code is being tested. (Alternatively, the static analysis may be performed in a production or run-time environment.) Once the static analysis has been carried out for a particular application, it is not necessary to repeat this analysis unless the application is changed and/or the instrumentation is to be carried out using a different set of criteria (as embodied in the wait point patterns 120 and/or meta-data 140).

The static analyzer's job is to identify the code locations within an application which are potential points where the application might wait on a resource, and in particular, where the application might cause a bottleneck when contending with other threads for access to the resource. As mentioned briefly earlier, there is a tension between effective code instrumentation and run-time performance, whereby instrumentation can adversely affect performance. Therefore, it is necessary to inject instrumentation in a "smart" way such that run-time analysis is possible and effective, yet extraneous instrumentation is avoided. The present invention is designed with these considerations in mind, and also allows an administrator to influence the outcome of the static analysis operation, if desired, such that the resulting instrumentation point location information will drive the programmatic byte code insertion accordingly. For example, a person such as a systems administrator (referred to generally herein as a systems administrator or simply an administrator, for purposes of illustration only) may determine that certain entry points or operations are not interesting, or that instrumentation of particular entry points or operations would result in inefficiently high overhead during operation of an application. The wait point patterns 120 can thus be adjusted to preclude instrumentation of particular code paths (as will be described, for example, with reference to Block 245 of FIG. 2); or, the administrator may inspect and modify the side information 160 before it is used to programmatically instrument an application.

More generally, the static analyzer may use a set of rules to guide its decisions about whether a code point should be considered for instrumentation. The rules may change over time, and thus are preferably coded as information within wait point patterns 120 that is consulted during the static analysis operation. In preferred embodiments, these rules control how deep the analysis proceeds, based on detecting invocations that are known through use of the wait points (where this information in the wait point patterns may also be considered a type of "rules base").

For example, the static analyzer might see that "Object.wait()" is being called by an application. Since the wait() operation is marked as "final" in the javalang.Object class, the analyzer knows that the application might wait at this point. During operation of the logic in FIG. 2, the analyzer therefore notes in its side information 160 the class and location within the class where the wait() is encountered.

Consider another example where an application is using a java.util.Hashtable invocation. As is known in the art, get() and put() operations that operate on a hash table are designed as synchronized methods so that collisions in accessing the hash table are avoided. However, the wait point patterns 120 preferably identifies these synchronized methods as being omitted from the list of interesting instrumentation points, because tracing monitor usage within these operations is not generally beneficial. Rather, it may be desirable to consider instrumenting the caller(s) of these operations, and thus catch potential contention related to a particular application's use of a hash table rather than affecting all users of all hash tables (and rather than inspecting code that is supplied as part of the standard run-time environment).

Turning now to FIG. 2, the static analysis begins at Block 200 by locating an entry point (e.g., by consulting meta-data 140 and matching an entry point identified therein to byte codes of an application being analyzed) and beginning a traversal through a code path of that entry point. Block 205 tests to see if this is the last entry point to be evaluated, and if so, the processing of FIG. 2 exits (Block 210). If not (i.e., if an entry point was located), then Block 215 initializes several variables or flags that are used in the processing of FIG. 2.

Block 215 sets a "known" flag to "no" or false, and a "mutex" flag to "no" or false. The "known" flag is used for indicating whether a particular target has been identified as a known wait point to be instrumented. Preferred embodiments use known wait point patterns 120 for specifying particular wait point targets that are of interest.

A number of known operations are used in code that waits. For example, the byte code 0×c2 (decimal 194) indicates a monitorEnter operation. Thus, searching for this byte code during static analysis will result in identifying occurrences of this operation—and subsequently instrumenting those occurrences. The targets of various invocations may be listed in the wait point patterns 120. For example, in the operation "invokevirtual java.lang.Object.wait()", the target is "java.lang.Object.wait()" (referred to hereinafter as "wait" or "wait()"), and this target is included in the known wait point patterns 120 in preferred embodiments. (Additional wait points may be added, according to the needs of a particular implementation.)

The "mutex" flag is used to indicate whether a particular byte code has been identified as a usage of the "monitorEnter" operation code ("opcode"). Preferred embodiments suppress evaluation of callee logic when a monitorEnter has been encountered.

The "monitorEnter" and invocation of "wait" targets provide direct synchronization, and preferred embodiments of the present invention insert byte code instrumentation before and after these instructions. Each before and after code block comprises code that checks to see if tracing for that instrumentation point is active, and if so, calls a runtime function to track monitor utilization and wait time. (Optionally, parameters that are passed by the existing code may also be recorded for analysis.) This code is described in more detail with reference to FIGS. 4-6.

Block 215 also sets a "sync" flag and a "jni" flag to "no". The "sync" flag indicates whether a method being invoked is a synchronized method, and the "jni" flag indicates whether native code is being invoked using the Java Native Interface ("JNI"). Identifying these types of methods enables the logic in FIG. 2 to provide special checks during static analysis, and thus the subsequent instrumentation for these methods is treated accordingly. Access to a synchronized method is controlled by the Java run-time, where the JVM implicitly invokes monitorEnter and monitorExit upon entry to and exit from the method. Therefore, callers of the synchronized method do not embed code to grab the monitor. Accordingly, when the static analyzer detects that a synchronized method is being called, it marks this calling location for subsequent instrumentation.

Many types of code may be synchronized in a particular application. Upon encountering an invocation of a synchronized method, the static analysis process records the calling locating in the side information, causing instrumentation to subsequently be generated at that location. Also, it might be desirable to allow drilling deeper into this synchronized code (as shown in FIG. 2 at Blocks 286 and 284), such that code points within the called method can be individually instrumented. The present invention allows the administrator to configure choices of this type using the wait point patterns 120 and meta-data 140, thereby influencing how the instrumentation is carried out for a particular application, as will be described with reference to Blocks 245 and 294.

Alternatively, the administrator may directly modify the side information 160, as will also be described below with reference to Block 290.

Instrumenting invocations of native code also requires special considerations. Native code, by definition, has no byte code to instrument. Therefore, preferred embodiments of the present invention allow instrumenting the callers of native code that makes use of monitors, instead of addressing the monitors directly. The "jni" flag, when set, prevents the logic of FIG. 2 from traversing into the called code (see Block 282).

It should be noted that while particular examples of code that waits are described herein, the techniques which are disclosed may be applied to any caller of any method known to potentially wait.

Returning again to the discussion of FIG. 2, after having initialized the flags in Block 215, Block 220 tests whether the current byte code being inspected is some type of invocation opcode (such as "invokevirtual" or "invokestatic"), FIG. 2 refers to this as an "invoke variant" or an "outcall". If the current byte code is an invoke variant, then processing continues at Block 245 to see if the target of the invocation is in the set of known wait points; otherwise, Block 230 checks to see if this byte code is "monitorEnter". When the test in Block 230 has a negative result (i.e., this is not "monitorEnter"), then this byte code is not of interest for instrumentation, and control passes to Block 225 which obtains the next-sequential byte code within this entry point, after which Block 205 begins the analysis of this next byte code.

When the test in Block 230 determines that this byte code is "monitorEnter", processing continues at Block 235 which sets the "mutex" flag to "yes" or true. Control then transfers to Block 290.

Having detected an invoke variant at Block 220, Block 245 then consults the wait point patterns 120, searching for the name and type of operation being invoked. Block 250 checks to see if this invocation target has been specified in the list of known wait point patterns 120. If so, Block 255 sets the "known" flag, and control then transfers to Block 288. Block 288 tests whether it is desirable to instrument this outcall by including instrumentation within the calling method (i.e., the caller). Preferably, this is determined by consulting the include/exclude instrumentation flag in wait point patterns 120. If it is desirable to instrument the caller, control passes to Block 290, and if not, to Block 296.

If this invoke variant is determined in Block 250 not to be one of the known wait points, then another test is performed at Block 260. This test checks to see if the outcall calls a synchronized method. If it does, the "sync" flag is set at Block 265, and control transfers to Block 290. Otherwise, Block 270 next checks to see if this outcall is an invocation of native code (i.e., a JNI invocation). When this test has a positive result, Block 275 sets the "jni" flag, and the processing of Block 290 is then carried out.

Optionally, a provision may be included for selectively suppressing instrumentation of particular synchronized methods and/or particular JNI invocations. In this case, Blocks 265 or 275, respectively, may be preceded by a test that determines whether the instrumentation of this synchronized method or JNI invocation is to be suppressed, and if so, control preferably transfers to Block 240. (Similarly, a provision may optionally be provided for selectively suppressing instrumentation of monitorEnter by inserting a test prior to Block 235, if desired.)

Figure 3:
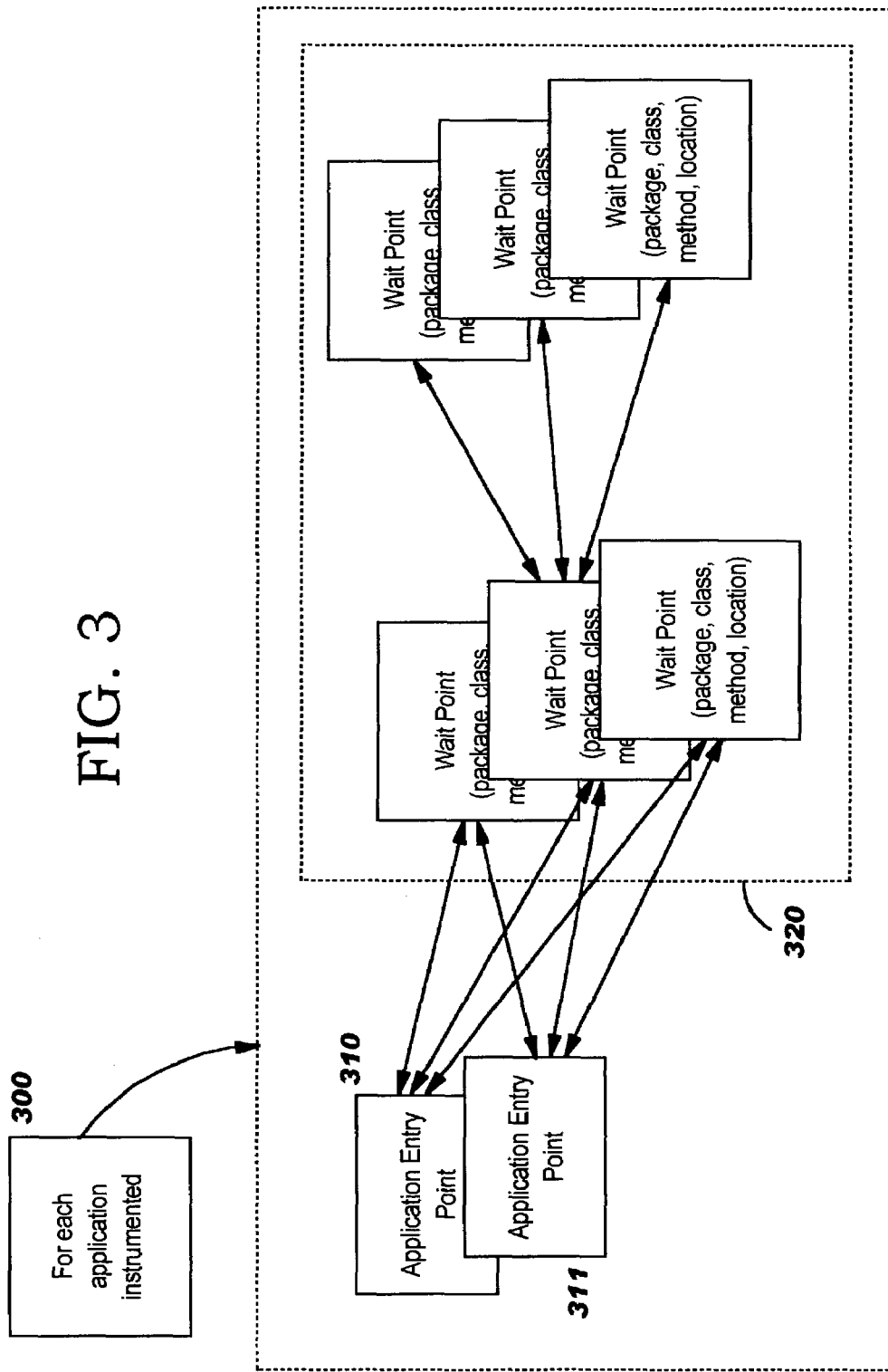
FIG. 3 illustrates, conceptually, how the output of FIG. 2 may be structured.

Block 290 adds the current location description (preferably in the form of application name, package name, class name, method name or signature, and byte code offset; the application name may be omitted if a single application is being analyzed and instrumented) to the set of instrumentation points being compiled in side information 160 for the current application and application entry point, if this code location description is not already recorded therein. FIG. 3 shows that, upon completion of the processing of FIG. 2, instrumentation points for each application 300 to be instrumented are identified, for each application entry point 310, 311, as a bidirectional acyclic graph of potential wait points (shown generally at 320). (Note that the calling methods store, as forward references, zero or more identifiers of their called methods that are to be instrumented. Traversing these references in a backward direction, from the called methods, enables constructing a bidirectional graph.)

Each of the instrumentation points (which are potential wait points) recorded in side information 160 is preferably identified by its package name, class name, method name (or method signature, if the parameter information is to be recorded), and location (i.e., relative position or offset). For each instrumentation point, additional information may be stored in side information 160. In particular, each entry preferably includes a flag indicating whether this instrumentation point is an outermost entry point; this information may be determined from the meta-data 140 (which, in preferred embodiments, identifies the outermost entry points for the application). Preferred embodiments also include a flag indicating whether detailed data accumulation should be performed within each outermost entry point.

Block 296 serves as a gathering point for several logic branches, and tests whether the "known" flag has been set. If so, the wait point patterns 120 are consulted at Block 294 to determine whether (Block 292) it is desirable to recursively analyze the byte code of the known wait point that is to be called. If this test in Block 292 has a negative result, control transfers to Block 240, where the next-sequential byte code is obtained. Otherwise, processing continues at Block 284, where the recursive analysis of the called logic (i.e., the callee) begins. This recursive analysis proceeds by obtaining the first byte code from the called logic (Block 240), and then iteratively analyzing each byte code in turn until reaching the end, after which the recursion returns (at Block 210).

When Block 296 determines that the "known" flag is not set, Block 286 next tests whether the "sync" flag is set (i.e., whether a synchronized method is called from the current location of the byte code being analyzed). If so, then a recursive analysis of the called code is performed (Block 284), such that any embedded wait points within that synchronized method can also be analyzed for instrumentation. Otherwise, Block 282 checks to see if the "jni" flag is set (i.e., whether a native method is being invoked). If so, the recursive analysis of that native code is avoided by transferring control directly to Block 240, which obtains the next-sequential byte code. If this is not an invocation of native code, then the test in Block 282 has a negative result, and Block 280 next checks to see if the "mutex" flag is set. As described earlier, the "mutex" flag is set upon encountering a usage of the "monitorEnter" opcode, and thus control transfers to Block 240 in this case, thereby avoiding analysis of a non-existent outcall. If the "mutex" flag is not set, on the other hand, then control transfers to Block 284 to begin a recursive analysis of the called code.

Preferably, the entry point(s) into an application is/are always instrumented, unless the application server implements a compatible approach at the application entry points. That is, it may happen in a particular implementation that the server run-time operates cooperatively with the techniques disclosed herein, whereby the server run-time may already be monitoring various byte codes. These run-time-monitored byte codes may include the outermost entry points (e.g., entry into a servlet, Enterprise JavaBean™, etc.). In this case, the application server's instrumentation points will be used instead of the application's entry points. In either case, it is anticipated that these outer-most entry points into the application will be monitored much of the time. (The results of this high-level tracing may be used in a number of ways. For example, application request rates and associated statistics may be gathered in this manner.) Note that this cooperative approach with the server run-time may be used for monitoring byte codes other than the application entry points, if desired. For example, the server run-time might be monitoring calls to particular methods such as getConnection. In this case, there is no need for callers of getConnection to be instrumented again using techniques of the present invention. Accordingly, the administrator preferably specifies an entry for getConnection in the wait point patterns 120, such that occurrences of this operation will be detected during static analysis and excluded from instrumentation (i.e., by following the "No" branch from Block 288).

The technique illustrated in FIG. 2 creates (at Block 290) side information 160 for a set of application entry points that are to be instrumented. Optionally, provision can be made for allowing a systems administrator to more directly control which code points actually get instrumented. For example, the side information 160 may be filtered or otherwise modified by the administrator (e.g., using a text editor or perhaps a specially-adapted editing tool) to add, delete, or change the instrumentation points that have been compiled during the static analysis operation. The administrator might choose, for example, to deactivate certain instrumentation points before load time, in order to avoid gathering trace data at those points. A run-time activation/deactivation process may also be provided, and in this case, the administrator preferably sets a configurable variable that will be tested by the programmatically-inserted methods that are invoked before entering a monitor and after releasing the monitor. (Refer to the discussion of FIGS. 6 and 12-13.)

Figure 4:
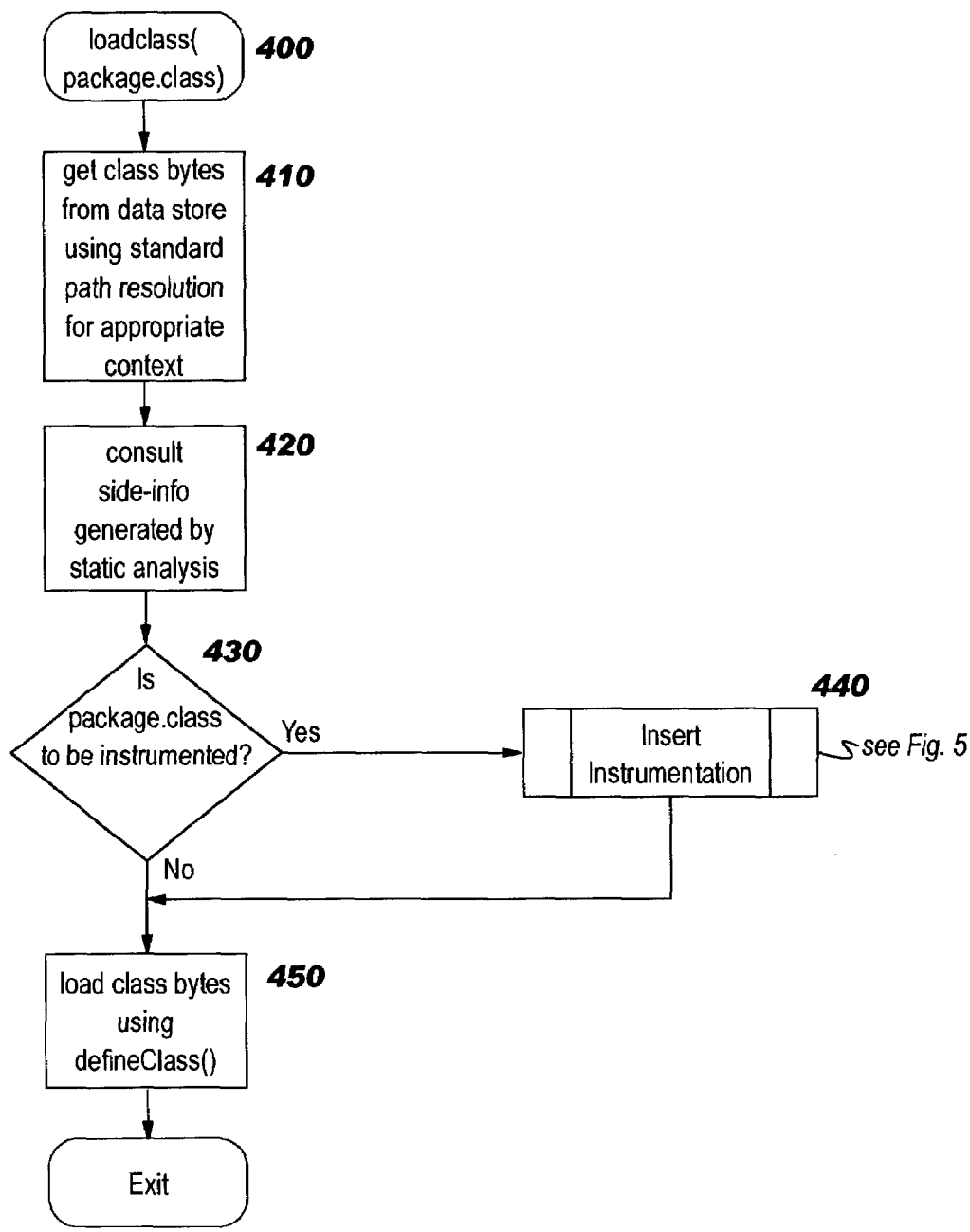
FIGS. 4-6 provide flowcharts depicting logic that may be used to programmatically instrument an application at appropriate instrumentation points (for example, using instrumentation points that have been determined according to FIG. 2)
Figure 5:
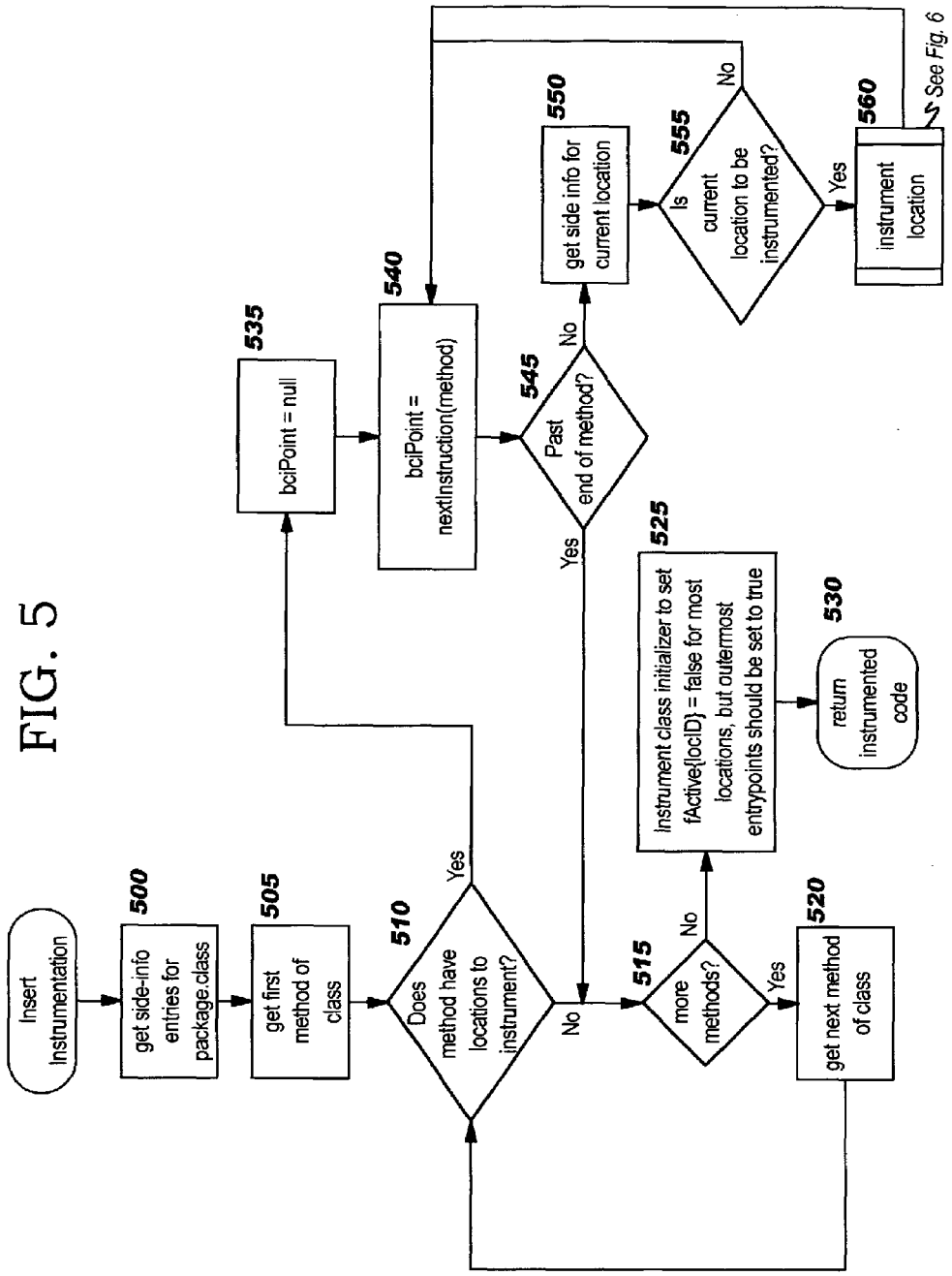
Figure 6:
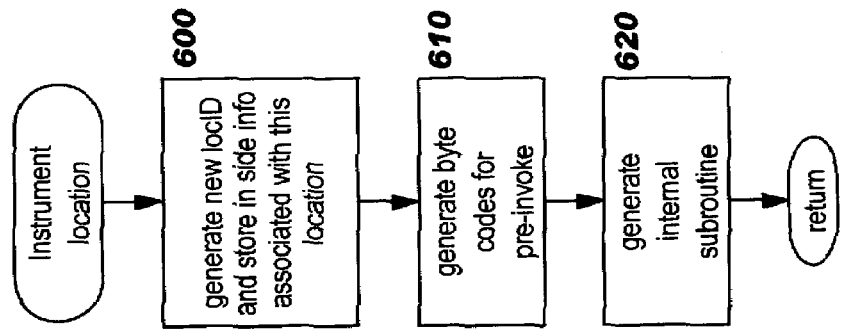

Turning now to FIGS. 4-6, the manner in which the load-time instrumentation operation 180 shown in FIG. 1 programmatically instruments an application at appropriate instrumentation points will now be described. As stated earlier, this instrumentation preferably occurs at class load time, and uses an augmented class loader. Using the side information 160 created by the static analyzer (and optionally filtered or otherwise modified by an administrator), class load operations are preferably intercepted using a hook inserted into the application server's run-time. As shown in FIG. 4, the loadClass operation 400 on a particular package and class comprises retrieving (Block 410) the byte codes for that class from a data store of some type (such as memory, a persistent store such as a disk, or perhaps from network-accessible storage) using prior art path resolution techniques that are appropriate for the current execution context.

Block 420 then consults the side information 160, and checks (Block 430) to see if an entry is contained therein for instrumenting code in the current package and class. If so, then at Block 440, a programmatic instrumentation operation is performed. This operation is illustrated in more detail in FIGS. 5 and 6. Upon returning therefrom, Block 450 loads the programmatically-instrumented byte codes of this class. Or, when the side information does not contain an entry requesting instrumentation of the current class, then Block 450 loads the byte codes retrieved at Block 410. The processing of FIG. 4 then exits, and the loaded class will typically be executed.

Referring now to FIG. 5, the side information entries for the current class of the current package are located (Block 500). Block 505 then locates the first method in the class retrieved at Block 410. Block 510 compares this method to the located side information from Block 500, and if this comparison indicates that the method has one or more locations to be instrumented, control transfers to Block 535. Otherwise, Block 515 checks to see if there are any more methods in this class, and if so, Block 520 gets the next method and that method is checked for instrumentation by returning to Block 510. On the other hand, when there are no more methods in the current class, then control reaches Block 525. Block 525 instruments the class initializer for this class such that it sets a static class variable referred to herein as "fActive{locID}", where "locID" is a location identifier that identifies a particular code location. Preferably, all instances of this variable within the current class are set to false except for the instance corresponding to the outermost entry point(s) of this application, and the variable for each of those instance(s) is set to true. Control then returns to the invoking code, preferably returning the instrumented code (or a pointer thereto) as a parameter (Block 530).

Returning to the discussion of Block 535, control reaches this block when the method being analyzed has one or more locations to be programmatically instrumented, according to the side information. Block 535 begins the instrumentation operation by initializing a variable "bciPoint" (for "byte code insertion point") to a null value. Block 540 then locates the next instruction within the current method, and sets the variable "bcipoint" to the address or offset of that instruction.

Block 545 checks to see if the bcipoint is beyond the end of the current method. If so, then all the instrumentation points within the method have been processed, and control returns to Block 515 to see if there are any more methods to analyze in the current class. If the bciPoint variable does not point beyond the current method, on the other hand, then Block 550 checks the side information to see if there are any entries for the current location (i.e., instruction) within this method. If there are (i.e., the test in Block 555 has a positive result), this is an indication that byte code instrumentation is to be programmatically inserted, and processing continues at Block 560. Otherwise, control returns from Block 555 to Block 540 to begin evaluating the next-sequential instruction within the current method.

At Block 560, the logic in FIG. 6 is invoked to carry out the programmatic instrumentation of the current location. Upon returning from that invocation, control transfers to Block 540 to get the next-sequential instruction within this method.

The location instrumentation of FIG. 6 begins (Block 600) by generating a new location ID ("locID") value, and storing this locID in the side information associated with the current location. (Preferably this locID was initialized to a null value at Block 290.) In preferred embodiments, this placeholder will be replaced at run time (after the class has been loaded) with an actual locID value, and the corresponding code location can then be quickly identified by reference. Once the placeholders are replaced with actual locID values, the side information 160 can then be accessed either by name/byte code offset, or by locID. Block 610 then programmatically generates byte codes for pre-invocation processing, i.e., code that will be executed prior to execution of the code at the identified instrumentation point. Block 620 programmatically generates byte codes for executing an internal subroutine (which includes post-processing code) at the point of instrumentation. Control then returns to the invoking logic in FIG. 5.

The pre-processing or pre-invocation byte code generated at Block 610 preferably performs the following operations:
1) checks a class static variable "fActive{locID}" to determine if the pre- and post-handler code pair should be active (and if not, then the remaining steps are skipped);
2) generates a current timestamp;
3) obtains or creates an instance of a data structure into which information pertaining to an execution of this programmatically-generated code can be stored (for example, for posting to a queue for subsequent analysis and/or recording);
4) obtains a context correlator for use in identifying, in the data to be recorded in the data structure, an execution of this programmatically-generated code; and
5) stores information into the data structure and posts it to the queue.

Preferably, the information stored in the data structure includes (i) the timestamp, (ii) the correlator, and (iii) all pertinent local information, where this local information includes an identification of the wait point, and may include parameter values or other state information as needed, depending (for example) upon the context of the wait point. In preferred embodiments, the correlator is assigned by a correlation service provided by the run-time, which provides a unique identification for the current high-level request associated with the outermost boundary (i.e., the processing of the inbound request). (Such correlation services are known in the art, and generate a unique correlator for each high-level request.) Use of the if statement to gate execution of the pre-invocation code (and of the post-invocation code, as described below) serves to minimize path-length (i.e., by skipping execution of the subsequent code) when tracing of monitors is not desired.

Figure 7:
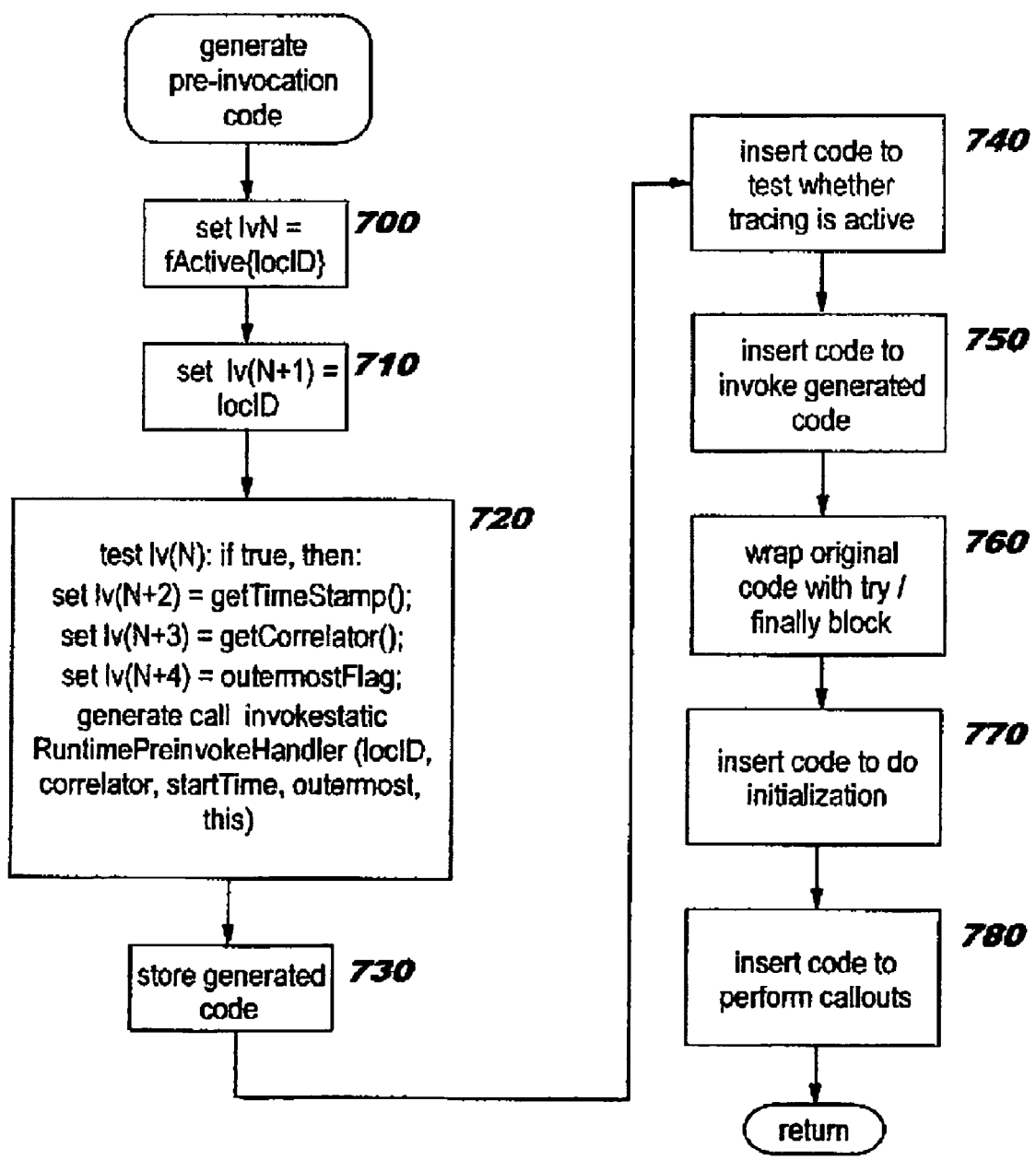
FIGS. 7 and 8 provide examples of logic which may be used in programmatically generating pre-invocation logic and an internal subroutine used for post-invocation logic, respectively.

The manner in which this pre-invocation code may be programmatically-generated is illustrated by the logic in FIG. 7. A number of local variables are used for storing the local information that will be copied to the data structure and posted to the queue. Assuming that some number "N−1" of local variables were generated at compile time for a particular method, preferred embodiments of the present invention then make use of six additional local variables. These are referred to herein as "lv(N)" through "lv(N+5)". At Block 700, code is generated that sets local variable "lv(N)" to the value of fActive{locID} (that is, the concatenation of the location identifier with the string "fActive"), where the resulting value will subsequently be used to determine whether this instrumentation point is to be activated or deactivated. (Note that it may be desirable to prepend additional characters to this string, to ensure that name collisions with other user variables are avoided.) Block 710 then generates code to set the value of the next local variable, "lv(N+1)", to the locID (i.e., the location identifier that identifies the instruction currently being instrumented). This local variable will be used as a constant value in preferred embodiments, which does not change across the outcall/mutex and therefore does not need code generated to reload its value.

Block 720 generates code that tests the value of "lv(N)" and then performs additional processing if this variable is set to true. In preferred embodiments, this additional processing comprises getting a time stamp (i.e., a starting time) and storing this time stamp into a variable "lv(N+2)"; generating a correlator for this instrumentation point and storing this correlator in a variable "lv(N+3)"; setting a variable "lv(N+4)" to a Boolean flag that indicates whether or not this instrumentation point is an outermost entry point (which, in preferred embodiments, is determined by consulting a flag in the side information 160 when the code is being instrumented—this flag then serves as a constant value within the generated code); and finally, performs an invocation of a run-time method. In preferred embodiments, the run-time method invocation uses an "invokestatic" attribute, the invoked method has a name such as "RuntimePreinvokeHandler", and a list of parameters is passed on this invocation. Preferably, the parameters include the locID and correlator values, the startTime timestamp, the outermost flag, and a pointer to the current object (e.g., "this").

Block 730 then generates code to persistently store the method created by execution of Blocks 700-720, and Block 740 generates code that tests the static class variable (to determine whether tracing should be active for this instrumentation point) and, upon finding it set to true, will invoke this stored method. The code generated at Block 740 is then programmatically inserted (Block 750), prior to the current instrumentation point. For example, suppose the originally-existing code syntax at the instrumentation point was "monitorEnter", and that the code stored at Block 730 uses the method name "RuntimePreinvokeHandler". (Preferably, if multiple instrumentation points occur within a single method, each uses the same invocation syntax, and the individual differences are distinguished by different location IDs.) Upon finishing Block 750, the code at this instrumentation point then comprises syntax that is represented by the following pseudocode (assuming that the static class variable is named "fActive1234"):

```
if (fActive1234)
    {
        RuntimePreinvokeHandler (locID, correlator, startTime,
        outermost, this)
    }
monitorEnter
```

As will be obvious to those of skill in the art, the pseudocode in the above example and the additional examples that follow is intended to represent the byte code that is being generated.

Note that the value of the "fActive1234" static class variable may be determined from configuration data, thereby enabling a systems administrator to dynamically activate or deactivate the run-time monitor tracing. In this case, code is programmatically generated to retrieve the value of the variable from an appropriate location.

Block 760 then generates code that surrounds the originally-existing code at the instrumentation point with a try/finally block. When inserting byte code, it is necessary to maintain the semantics of the original code, as stated earlier, and also to provide for managing exception handling appropriately. Many invoke variants (and monitorEnter) may throw exceptions. For this reason, preferred embodiments preferably wrap the existing syntax of the instrumentation point with a try/finally block to ensure that exceptions are addressed (thereby ensuring that proper accounting of the wait time is achieved). (In alternative embodiments, generation of the try/finally block may be suppressed in cases where it is known that there can be no exception.)

Using the same example instrumentation point as shown above, upon finishing Block 760, the code at this instrumentation point then comprises syntax that is represented by the following pseudocode:

```
if (fActive1234)
    {
        RuntimePreinvokeHandler (locID, correlator,
        startTime, outermost, this)
    }
try
    {
        monitorEnter
    }
finally
    {
    }
```

(A catch would also be generated in the byte code, although this is not shown in the examples herein.)

Block 770 generates initialization byte codes for the additional variables that will be needed at run time, such as the locID and startTime variables, and embeds this initialization into the byte code. These additional variables correspond to the input parameters that will be passed to the pre-invocation and post-invocation code, and the static class variable that will be used to indicate whether tracing is currently active. (Refer to the examples in FIGS. 9A, 9B, 10A, and 10B for an example of how these variables are generated.)

Block 780 then generates and embeds code to build the callouts that are required at run time. In preferred embodiments, three callouts are used, comprising (1) a call to a correlator service to obtain the current correlator value for the execution context (i.e., the client request); (2) a call to a high-resolution timer to generate the starting time; and (3) another call to the high-resolution timer to generate the ending time. The processing of FIG. 7 then ends.

Figure 8:
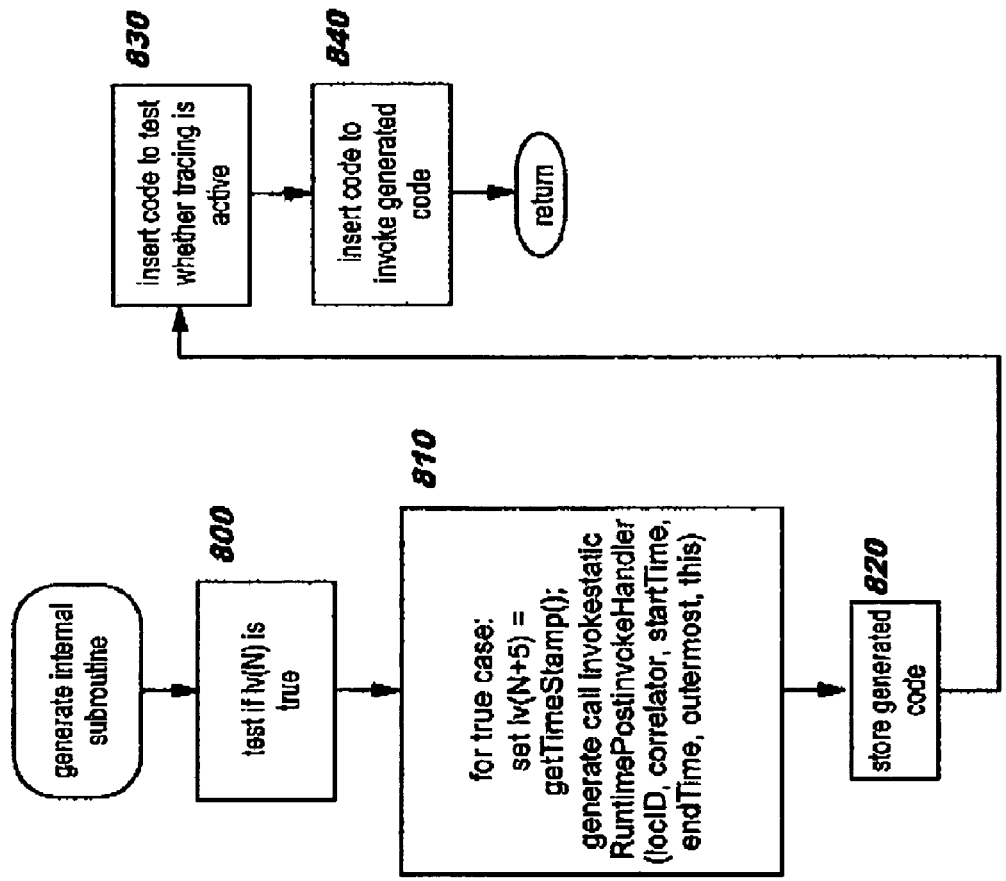

Referring now to FIG. 8, the manner in which the programmatically-generated internal subroutine code created at Block 620 of FIG. 6 may be generated will now be described.

The local variables described above with reference to FIG. 7 are also used in preferred embodiments of the internal subroutine code. Thus, at Block 800, code is generated that obtains the first local variable "lv(N)" and tests to see if that value is true. Block 810 generates code to be executed when the variable is set to true. In preferred embodiments, this code to be executed comprises getting a new time stamp (i.e., an ending time) and storing this new time stamp into a variable "lv(N+5)"; and then performing an invocation of a run-time method. Note that a number of values will remain in the data structure into which local information was stored during the pre-invocation code. These values include the startTime, the correlator for this instrumentation point, and the outermost flag.

In preferred embodiments, the run-time method invocation generated at Block 810 uses an "invokestatic" attribute, the invoked method has a name such as "RuntimePostinvokeHandler", and a list of parameters is passed on this invocation. Preferably, the parameters include the locID and correlator values, the startTime and endTime timestamps, the outermost flag, and a pointer to the current object (e.g., "this").

Block 820 then generates code to persistently store the post-invocation method created by execution of Blocks 800-810, and Block 830 generates code that is embedded within the finally block. This generated code tests the static class valiabte (to determine whether tracing should be active for this instrumentation point) and, upon finding it set to true, will invoke this stored post-invocation method. The code generated at Block 830 is then programatically inserted (Block 840) inside the finally block that follows the current instrumentation point. Using the same example code syntax described above, upon finishing Block 840, the code at the current instrumentation point then comprises syntax that is represented by the following pseudocode:

```
if (fActive1234)
    {
    RuntimePreinvokeHandler (locID, correlator, startTime,
        outermost, this)
    }
try
    {
    monitorEnter
    }
finally
    {
    if (fActive1234)
        {
        RuntimePostinvokeHandler (locID, correlator, startTime,
            endTime, outermost, this)
        }
    }
```

Note that, if there was a label associated with the original instrumentation point, then this label must be programmatically moved such that it points to the "if(fActive1234)" code that precedes that original instrumentation point.

FIGS. 9A and 9B show an example of a simple class "FinallyTest", written in the Java programming language, and its corresponding byte code, respectively. This class contains a method named "doit()", which executes to print the words "Original code" on System.out. A revised version of the Java code is shown in FIG. 10A. This revised version is intended to represent what the source code would look like if it was instrumented, although as stated herein, the present invention instruments the byte code. FIG. 10B shows instrumented byte code which may be created programmatically from the original byte code in FIG. 9B, using techniques disclosed herein. In these examples, it is presumed that the invocation of System.out.println was specified in the wait point patterns 120, causing the static analyzer to identify its location for load-time instrumentation. (This invocation corresponds to an "invokevirtual void java.io.PrintStream-.println (java.lang.string)" operation, as shown in the byte code in FIG. 9B.) Note that in the example in FIG. 10A, the first "if" test for whether tracing is active (using the variable "_fActive__1234)" is embedded within the try block, rather than enclosing the entire try/finally block as described earlier with reference to FIG. 8. This is an implementation choice, and does not affect actual execution.

Figure 11:
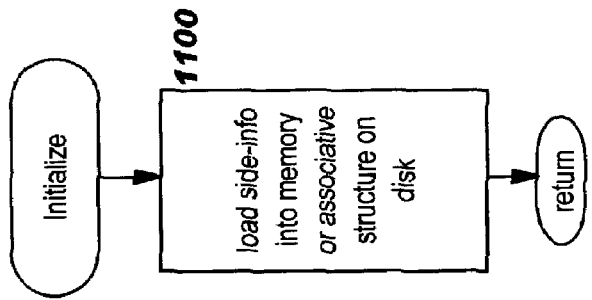
FIGS. 11-13 provide flowcharts depicting logic that may be used to implement the run-time tracing to be performed at the instrumentation points.
Figure 12:
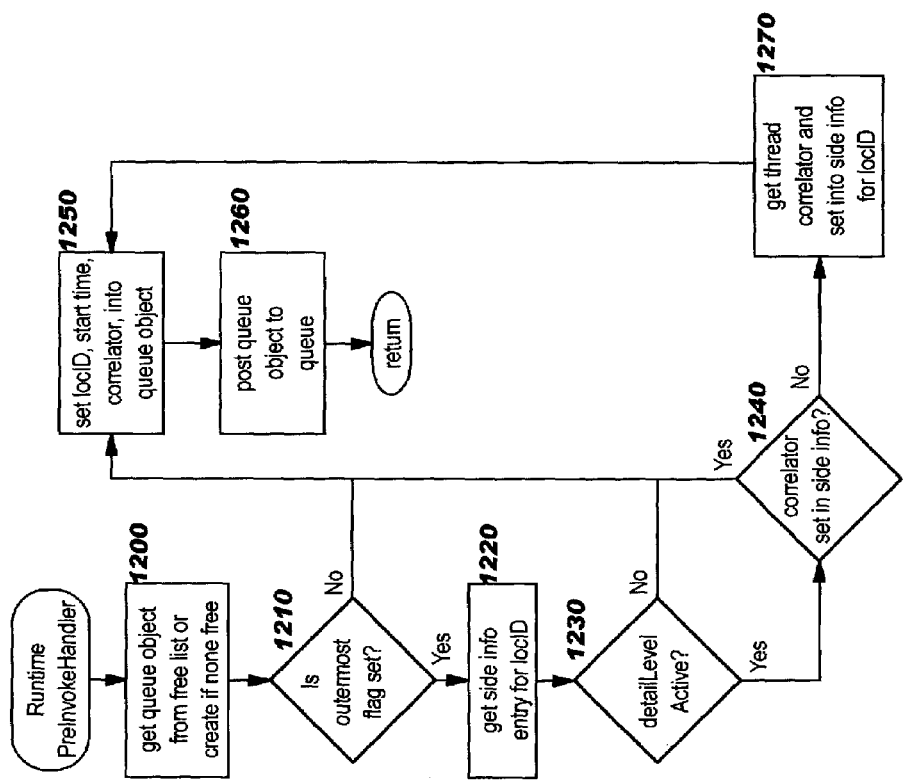
Figure 13:
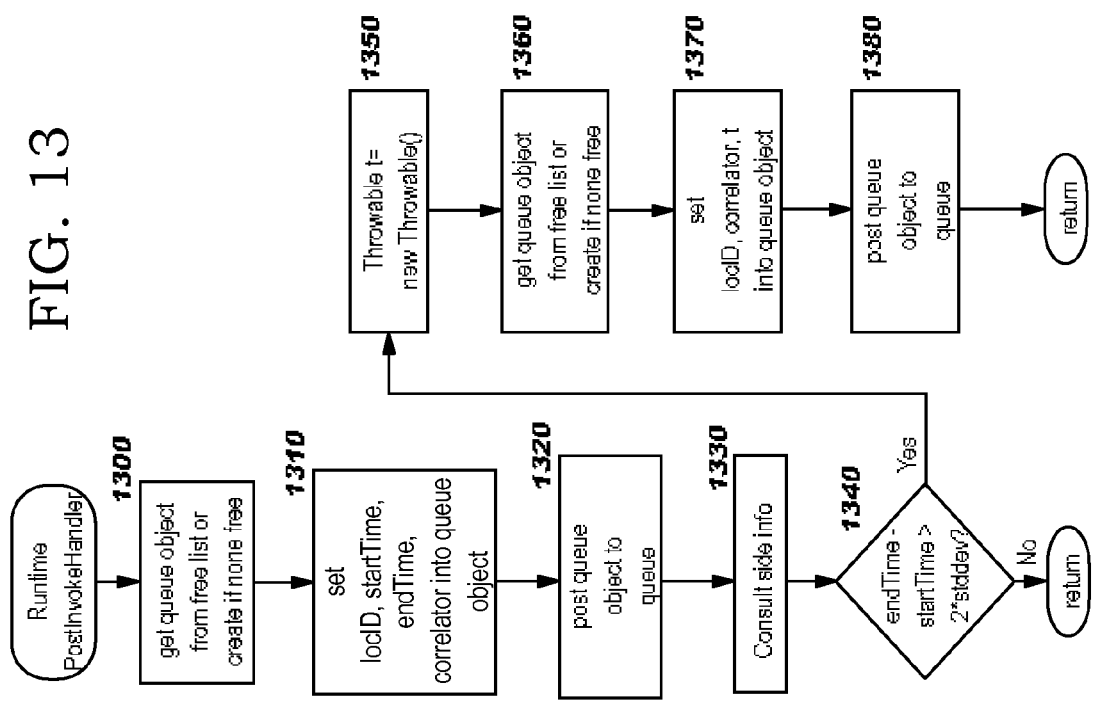

Referring now to FIGS. 11-13, operation of the programmatically inserted byte code will now be described. FIG. 11 illustrates initialization that occurs, and comprises programmatically loading the side information 160 into memory or some associative structure on disk. Preferably, a two-level cache is used, because the data will typically be relatively large. This side information is preferably used, at run time, when capturing data for performance measurements (as will be described with reference to FIGS. 12 and 13). A configuration parameter may be set to indicate that run-time tracing as disclosed herein is being performed, and to thereby trigger operation of FIGS. 11-13.

The run-time pre-invocation handler was described above with reference to FIG. 7. More detail on how this code operates is provided in FIG. 12. In Block 1200, the next queue object (or, more generally, the next available data structure) is retrieved from a system free list; or, if no free object is available, a new instance is programmatically created. Block 1210 checks the "outermost" flag, which will be passed (along with the locID, correlator, startTime, and current object pointer) to this logic during execution. (Refer to the discussion of FIG. 7, above.) If this flag is set to true, then at Block 1220, the entry matching the current locID value is retrieved from the side information. Block 1230 uses the locID value to determine whether detailed tracing should be enabled for instrumenting this outermost entry point.

In preferred embodiments, instrumentation points that correspond to outermost entry points include an additional flag in the side information 160, indicating whether a detailed level of data accumulation should be active for code entered from this entry point. This flag, along with the correlator associated with the current request, are used to determine whether detailed data should be gathered for this request. If so, the detailed data will be gathered, and the mechanism will then be turned off. (It is turned on by the background queue handler at Block 1455 of FIG. 14, and turned off at Block 1470 of FIG. 14.) The entry point will detect the "detail on" flag in the pre-invoke handler, which checks the correlator in the side information for the entry point.

If the test in Block 1230 has a negative result, then processing continues at Block 1250; otherwise, Block 1240 first checks to see if the current value of the correlator is found in the side information.

If the test in Block 1240 has a negative result (i.e., the current correlator is not set in the side information), then control transfers to Block 1270, where this thread's correlator is obtained and set into the side information in association with the current value of locID. When the correlator is null (i.e., the negative result case for Block 1240), this is used as an indication that this instance of the entry point (i.e., the invocation of the entry point that is executing for processing the current request) is expected to gather data. Therefore, setting the correlator in the side information at Block 1270 functions as a flag that notifies other request instances that they are not accumulating data. (The flag in the side information gets reset after post processing. The flag is set, according to preferred embodiments, in two cases: first, when a timeout occurs, and baseline information for the performance measurements needs to be acquired; and second, when a particular entry point's execution time is outside its typical range.) Refer to the discussion of Blocks 1450-1460 for more information.

Block 1250 sets a number of values in the data structure or queue object obtained in Block 1200. In preferred embodiments, these values comprise the locID associated with the current instrumentation point as well as the startTime and correlator that were passed as input to this code. After having stored these values, Block 1260 then posts the queue object or data structure to a queue or other repository for subsequent processing and analysis. The processing of the current pre-invocation handler is then finished, and FIG. 12 ends.

Turning now to FIG. 13, the run-time post-invocation handler described above with reference to FIG. 8 will now be described in more detail. In Block 1300, the next queued object (or, more generally, the next available data structure)

is retrieved from a system free list; or, if no free object is available, a new instance is programmatically created.

Block 1310 sets a number of values in the data structure or queue object obtained in Block 1300. In preferred embodiments, these values comprise the locID associated with the current instrumentation point as well as the startTime, endTime, and correlator that were passed as input to this code. After having stored these values, Block 1320 then posts the queue object or data structure to a queue or other repository (e.g., for subsequent processing and analysis).

Block 1330 then consults the side information to obtain the accumulated standard deviation for this instrumentation point, and Block 1340 then checks the input parameters to determine whether the difference between the end time and start time of the current execution of this instrumentation point (i.e., the current elapsed execution time, including any periods of waiting) is more than twice the previously-stored standard deviation. If the current elapsed execution time is not more than twice the standard deviation, then it may be considered that this instrumentation point is executing within relatively normal bounds. The processing of the current post-invocation handler is then finished, and FIG. 13 simply exits.

When the elapsed execution time is more than twice the previous standard deviation, then it may be considered that this instrumentation point is not executing within normal bounds. For example, contention among wait points may have caused the elapsed execution time to be abnormally long. Accordingly, the exception case processing of Blocks 1350-1380 is invoked to respond to this abnormal situation. (It should be noted that the product of two times the standard deviation is used herein merely for purposes of illustration, and does not limit the present invention in any way. Other techniques for determining whether wait points are elongating elapsed execution time may be used alternatively, including, but not limited to, the substitution of a different constant multiplier.)

Block 1350 begins the exception case processing by instantiating a variable "t" as an instance of a new throwable exception. (Note that this code is provided by the run-time.) In Block 1360, a queue object or similar data structure is obtained or created, and the current values of the locID, the current correlator, and the execution stack for "t" are stored into this queue object or data structure (Block 1370), representing the out-of-bounds execution time exception that has occurred. The queue object or data structure is then pushed onto a queue (Block 1380) for subsequent analysis (see Blocks 1410 and 1415), and the processing of this invocation of the post-invocation logic then exits.

The disclosed techniques are very powerful, and provide for capturing a great deal of information about system performance. This information may be fed back, either to the owners of the system (for example, in printed reports) or to code running within the system, e.g., to help understand the run-time behavior and performance characteristics of the system. Autonomic software running within the system could use this information in a number of ways, including to automate recovery and work-arounds for performance problems.

Figure 14:
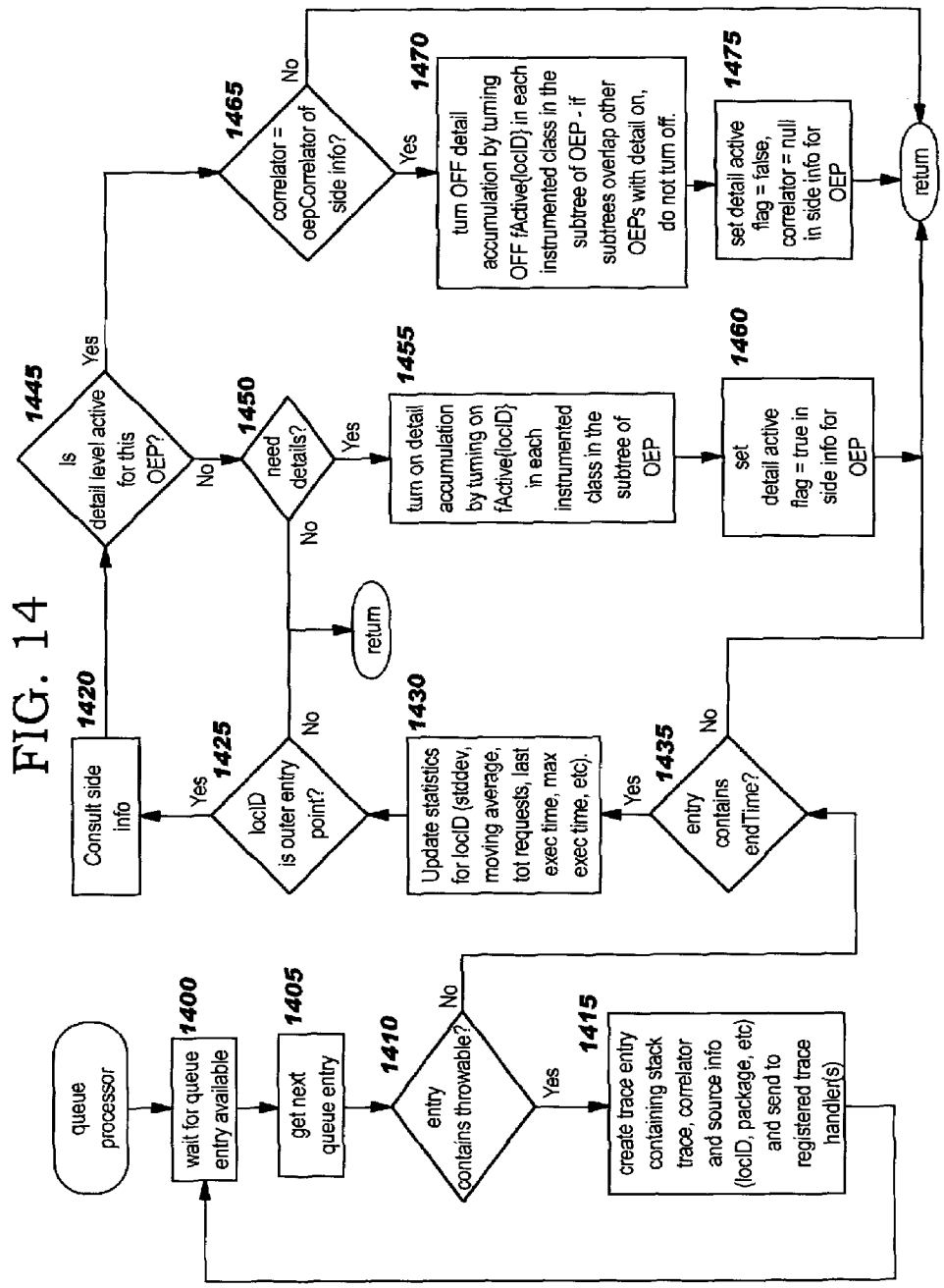
FIG. 14 provides a flowchart depicting logic that may be used for analyzing the results gathered by the run-time tracing code illustrated in FIGS. 12 and 13.

The logic in FIG. 14 depicts one way in which the results gathered by the run-time tracing code (illustrated in FIGS. 12 and 13) may be analyzed. Block 1400 waits for a queued entry to become available. (See Blocks 1260, 1320, and 1380, where queue entries are posted.) Block 1405 then retrieves the next queued entry from the queue. Block 1410 checks to see if the removed entry contains an out-of-bounds exception (posted to the queue by Block 1380). If so, then Block 1415 creates a trace entry containing the stack trace, correlator, and source information that are contained in the removed queue entry for this exception. In preferred embodiments, the source information comprises the location identifier (locID), package name, class name, method name/signature, and byte offset for the instrumentation point. This trace entry is then sent to a registered trace handler or handlers. (This is one manner in which the execution stack may be captured, so that it can be used for later analysis to track down how various wait points were entered. By capturing the execution stack only for the out-of-bounds cases, this processing overhead is avoided except where necessary.) Control then returns to Block 1400 to begin processing the next queued entry.

When control reaches Block 1435, the entry removed from the queue does not contain an exception, and Block 1435 next checks to see if the removed queue entry contains a value for the endTime parameter, which would have originally been stored into the queue object from lv(N+5). If it does, then this removed entry represents the end of a wait, and the statistics for the wait (which, in preferred embodiments, are maintained in side information 160) are then processed beginning at Block 1430; otherwise, if there is no endTime parameter value, the processing of FIG. 14 exits.

Block 1430 updates the statistics for the locID value from the removed queue entry. These statistics preferably include the standard deviation of elapsed execution time, a moving average of elapsed execution time, the total number of requests that have encountered this instrumentation point during run time, the last elapsed execution time for an invocation of this instrumentation point, and the maximum elapsed execution time for this instrumentation point, Block 1425 then checks to see if this locID represents an outermost entry point by checking the "outermost" flag from the removed queue entry. If not, the processing of FIG. 14 exits. Otherwise, the side information 160 is consulted (Block 1420), and Block 1445 checks to see if the side information indicates that detailed data gathering is being performed within the code of this outermost entry point. (Refer to the discussion of Blocks 1230, 1240, and 1270, above, for more information about detailed data gathering.)

If the test in Block 1445 has a negative result, then processing continues at Block 1450; otherwise, control transfers to Block 1465. Block 1450 tests to see if it is desirable to begin gathering more detailed data at this instrumentation point. In preferred embodiments, this comprises testing for occurrence of one of the following two cases. First, if the elapsed execution time for the current request (computed by subtracting startTime from endTime, where these values are stored in the queue object, and were originally set from local variables N+2 and N+5, respectively) was greater than twice the standard deviation for earlier invocations of this instrumentation point, then this request went out of normal execution bounds, and additional details should be gathered on subsequent invocations. (For example, the request may have experienced contention for a shared resource at this instrumentation point, causing it to wait for an abnormally long time.) Second, if detailed data gathering has not been performed in a sufficiently-recent time interval, then additional details should be gathered. The time interval case may be implemented by storing a value "lastDetailTime" in side information 160 with each outermost entry point, and setting this variable to a current timestamp whenever detailed data has been gathered. The difference between the current time and the time stored in lastDetailTime is computed at Block 1450 (if the first, "out of bounds", test was not met), and if the result is greater than a configurable baseline timeout value, then it is time to gather detailed data again (and thus the test in Block 1450 will have a positive result). When the test in Block 1450 has a negative result, then it is not necessary to gather additional details for subsequent invocations of this instrumentation point, and the processing of FIG. 14 exits. Otherwise, processing continues at Block 1455.

Block 1455 turns on detailed data accumulation for this instrumentation point by setting the static variable "fActive{locID}" to on in each instrumented class within the subtree of this outermost entry point. Block 1460 then sets a "detail active" flag to true in the side information 160 for this outermost entry point. (This flag is tested in Block 1230, described above.) Processing of FIG. 14 then exits.

Block 1465 is reached when detailed data accumulation is active for an outermost entry point ("OEP"). A check is made to see if the current value of the correlator identifies a thread correlator for this outermost entry point in the side information 160. (Refer to the discussion of Blocks 1230 and 1240, above, for more information about detailed tracing and use of the correlator as a flag in the side information.)

If the test in Block 1465 has a negative result (i.e., the current correlator is not used in the side information to identify a thread correlator of this outermost entry point), then the processing of FIG. 14 exits. Otherwise, Block 1470 executes, and comprises turning off the detailed data accumulation by setting the static variable "fActive{locID}" off for each instrumented class in the subtree of this outermost entry point. Note that if these subtrees overlap any other outermost entry points that have detailed data accumulation set on, then the static variable for instrumentation points within those subtrees is not turned off. Block 1475 then sets the "detail active" flag to false, and sets the correlator for this outermost entry point to null in side information 160. The processing of FIG. 14 then exits.

In an optional aspect of the present invention, one or more of the programmatically-instrumented class files may be stored persistently (at least temporarily), and when a subsequent invocation of an instrumented class is encountered, the persistent storage (such as a classpath override directory) may be checked to see if an already-instrumented version of the class is available. Finding an instrumented version allows bypassing operation of the dynamic instrumentation process, and may therefore result in a reduction in run-time processing overhead as well as generally faster reloads. (It should also be noted that there may be environments where storing already-instrumented code is not desirable. In these environments, the persistent storage capability may be disabled or omitted.)

The present invention may be provided as method(s) of doing business. For example, a business entity may provide a service that monitors the performance of one or more application servers using techniques disclosed herein. This service may be provided under various revenue models, such as pay-per-use billing, monthly or other periodic billing, and so forth.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may be embodied in a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions (which execute via the processor of the computer or other programmable data processing apparatus) create means for implementing the functions specified in the flowchart and/or block diagram block or blocks.

These computer program instructions may also be stored in one or more computer-readable memories, where each such memory can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto one or more computers or other programmable data processing apparatus to cause a series of operational steps to be performed on the computers or other programmable apparatus to produce, on each such device, a computer implemented process such that the instructions which execute on the device provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. In particular, while the present invention has been described with reference to the Java programming language and certain features of that language, the inventive concepts disclosed herein may be adapted to changes in this language or its features, and may be used with alternative languages and/or features which function in an analogous manner to those discussed herein. Therefore, it is intended that the appended claims shall be construed to include preferred embodiments and all such variations and modifications as fall within the spirit and scope of the invention.

What is claimed is:

1. A method of tracing run-time waits to measure time spent waiting due to synchronization, comprising steps of:

programmatically performing code analysis prior to execution of an application, further comprising steps of:

comparing byte code of the application to stored patterns that describe known wait points where code may wait to get a monitor that synchronizes access to a shared resource, thereby locating one or more locations in the code where a wait due to synchronization may occur at run time; and recording the located locations; and programmatically instrumenting the located locations, during execution of the application at run time, further comprising steps of:

intercepting load requests for executable elements of the application, as each executable element is to be loaded for execution; and invoking an augmented class loader to carry out each of the intercepted load requests, wherein the augmented class loader creates an instrumented version of the executable element that is to be loaded by consulting the recorded locations to determine ones thereof which are found in the executable element and programmatically inserting pre-invocation byte code before each of the determined ones and post-invocation byte code after each of the determined ones, wherein the pre-invocation byte code and the post-invocation byte code are executable to generate data for measuring the time spent waiting at each of the determined ones due to synchronization, and then loads the instrumented version for execution instead of loading the executable element.

2. The method according to claim 1, wherein the comparing step consults a specification of operation code patterns to be included when locating the location where a wait may occur.

3. The method according to claim 1, wherein the comparing step consults a specification of operation code patterns to be excluded when locating the locations where a wait may occur.

4. The method according to claim 1, further comprising the step of modifying the recorded locations to exclude one or more thereof prior to the execution of the application.

5. The method according to claim 1, wherein the augmented class loader programmatically inserts the pre-invocation byte code before, and the post-invocation byte code after, only the determined ones for which a variable setting indicates that run-time tracing is to be performed.

6. The method according to claim 1, further comprising the step of selectively deactivating operation of the programmatically inserted pre-invocation byte code and the programmatically inserted post-invocation byte code for one or more of the determined ones at run time.

7. The method according to claim 1, further comprising steps of:

executing the pre-invocation byte code and the post-invocation byte code to generate the data for measuring the time spent waiting at at least one of the determined ones due to synchronization;

computing, from the generated data for each of the at least one of the determined ones, the time spent waiting at that determined one; and recording, for each of the at least one of the determined ones, the computed time spent waiting.

8. The method according to claim 1, wherein the stored patterns that describe known wait points further comprise where code may wait for a notification from other code to thereby enforce an order of execution.

9. A system for tracing run-time waits to measure time spent waiting due to synchronization in a computing environment, comprising:

means for programmatically performing code analysis prior to execution of an application, further comprising:
means for comparing byte code of the application to stored patterns that describe known wait points where code may wait to get a monitor that synchronizes access to a shared resource, thereby locating one or more locations in the code where a wait due to synchronization may occur at run time; and
means for recording the located locations; and means for programmatically instrumenting the located locations, during execution of the application at run time, further comprising:
means for intercepting load requests for executable elements of the application, as each executable element is to be loaded for execution; and
means for invoking an augmented class loader to carry out each of the intercepted load requests, wherein the augmented class loader creates an instrumented version of the executable element that is to be loaded by consulting the recorded locations to determine ones thereof which are found in the executable element and programmatically inserting pre-invocation byte code before each of the determined ones and post-invocation byte code after each of the determined ones, wherein the pre-invocation byte code and the post-invocation byte code are executable to generate data for measuring the time spent waiting at each of the determined ones due to synchronization, and then loads the instrumented version for execution instead of loading the executable element.

10. The system according to claim 9, wherein the means for comparing consults a specification of operation code patterns to be included when locating the location where a wait may occur.

11. The system according to claim 9, wherein the means for comparing consults a specification of operation code patterns to be excluded when locating the locations where a wait may occur.

12. The system according to claim 9, further comprising means for modifying the recorded locations to exclude one or more thereof prior to the execution of the application.

13. The system according to claim 9, wherein the augmented class loader programmatically inserts the pre-invocation byte code before, and the post-invocation byte code after, only the determined ones for which a variable setting indicates that run-time tracing is to be performed.

14. The system according to claim 9, further comprising means for selectively deactivating operation of the programmatically inserted pre-invocation byte code and the programmatically inserted post-invocation byte code for one or more of the determined ones at run time.

15. The system according to claim 9, further comprising:
means for executing the pre-invocation byte code and the post-invocation byte code to generate the data for measuring the time spent waiting at at least one of the determined ones due to synchronization;
means for computing, from the generated data for each of the at least one of the determined ones, the time spent waiting at that determined one; and
means for recording, for each of the at least one of the determined ones, the computed time spent waiting.

16. The system according to claim 9, wherein the stored patterns that describe known wait points further comprise where code may wait for a notification from other code to thereby enforce an order of execution.

17. A computer program product for tracing run-time waits to measure time spent waiting due to synchronization, the computer program product embodied on one or more computer-readable media and comprising:

computer-readable program code for programmatically performing code analysis prior to execution of an application, further comprising:
computer-readable program code for comparing byte code of the application to stored patterns that describe known wait points where code may wait to get a monitor that synchronizes access to a shared resource, thereby locating one or more locations in the code where a wait due to synchronization may occur at run time; and computer-readable program code means for recording the located locations; and computer-readable program code for programmatically instrumenting the located locations, during execution of the application at run time, further comprising:

computer-readable program code for intercepting load requests for executable elements of the application, as each executable element is to be loaded for execution; and computer-readable program code for invoking an augmented class loader to carry out each of the intercepted load requests, wherein the augmented class loader creates an instrumented version of the executable element that is to be loaded by consulting the recorded locations to determine ones thereof which are found in the executable element and programmatically inserting pre-invocation byte code before each of the determined ones and post-invocation byte code after each of the determined ones, wherein the pre-invocation byte code and the post-invocation byte code are executable to generate data for measuring the time spent waiting at each of the determined ones due to synchronization, and then loads the instrumented version for execution instead of loading the executable element.

18. The computer program product according to claim 17, wherein the computer-readable program code for comparing consults a specification of operation code patterns to be included when locating the location where a wait may occur.

19. The computer program product according to claim 17, wherein the computer-readable program code for comparing consults a specification of operation code patterns to be excluded when locating the locations where a wait may occur.

20. The computer program product according to claim 17, further comprising computer-readable program code for modifying the recorded locations to exclude one or more thereof prior to the execution of the application.

21. The computer program product according to claim 17, wherein the augmented class loader programmatically inserts the pre-invocation byte code before, and the post-invocation byte code after, only the determined ones for which a variable setting indicates that run-time tracing is to be performed.

22. The computer program product according to claim 17, further comprising computer-readable program code for selectively deactivating operation of the programmatically inserted pre-invocation byte code and the programmatically inserted post-invocation byte code for one or more of the determined ones at run time.

23. The computer program product according to claim 17, further comprising:

computer-readable program code for executing the pre-invocation byte code and the post-invocation byte code to generate the data for measuring the time spent waiting at at least one of the determined ones due to synchronization;

computer-readable program code for computing, from the generated data for each of the at least one of the determined ones, the time spent waiting at that determined one; and computer-readable program code for recording, for each of the at least one of the determined ones, the computed time spent waiting.

24. The computer program product according to claim 17, wherein the stored patterns that describe known wait points further comprise where code may wait for a notification from other code to thereby enforce an order of execution.

25. A method of doing business by tracing wait points in an executing application to measure time spent waiting due to synchronization, comprising steps of:

performing programmatic code analysis prior to execution of an application, further comprising steps of:

programmatically comparing byte code of the application to stored patterns that describe known wait points where code may wait to get a monitor that synchronizes access to a shared resource, thereby locating one or more locations in the code where a wait due to synchronization may occur at run time; and programmatically recording the located locations;

programmatically instrumenting the located locations, during execution of the application at run time, further comprising steps of:

intercepting load requests for executable elements of the application, as each executable element is to be loaded for execution; and invoking an augmented class loader to carry out each of the intercepted load requests, wherein the augmented class loader creates an instrumented version of the executable element that is to be loaded by consulting the recorded locations to determine ones thereof which are found in the executable element and programmatically inserting pre-invocation byte code before each of the determined ones and post-invocation byte code after each of the determined ones, wherein the pre-invocation byte code and the post-invocation byte code are executable to generate data for measuring the time spent waiting at each of the determined ones due to synchronization, and then loads the instrumented version for execution instead of loading the executable element;

executing the pre-invocation byte code and the post-invocation byte code to generate the data for measuring the time spent waiting at at least one of the determined ones due to synchronization;

computing, from the generated data for each of the at least one of the determined ones, the time spent waiting at that determined one;

programmatically recording, for each of the at least one of the determined ones, the computed time spent waiting; and charging a fee for carrying out the steps of performing programmatic code analysis, programmatically instrumenting, executing, computing, and programmatically recording.

* * * * *